(12) United States Patent
Stoller et al.

(10) Patent No.: US 8,969,793 B2
(45) Date of Patent: Mar. 3, 2015

(54) DOWNHOLE NEUTRON ACTIVATION MEASUREMENT

(75) Inventors: Christian Stoller, Princeton Junction, NJ (US); Peter Wraight, Skillman, NJ (US); Brad Roscoe, Ridgefield, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 586 days.

(21) Appl. No.: 12/996,541

(22) PCT Filed: Jun. 26, 2009

(86) PCT No.: PCT/US2009/048810
§ 371 (c)(1),
(2), (4) Date: Mar. 30, 2011

(87) PCT Pub. No.: WO2010/002727
PCT Pub. Date: Jan. 7, 2010

(65) Prior Publication Data
US 2011/0198488 A1    Aug. 18, 2011

Related U.S. Application Data

(60) Provisional application No. 61/077,524, filed on Jul. 2, 2008.

(51) Int. Cl.
*G01V 5/10* (2006.01)
(52) U.S. Cl.
CPC ...................................... *G01V 5/102* (2013.01)
USPC .................... 250/269.6; 250/259; 250/260
(58) Field of Classification Search
USPC ............................ 250/269.1–269.8, 259, 260
See application file for complete search history.

(56) References Cited

U.S. PATENT DOCUMENTS

| 3,662,173 A | | 5/1972 | Withrow |
| 3,665,195 A | | 5/1972 | Youmans |
| 3,707,700 A | * | 12/1972 | Lafont ....................... 340/855.3 |
| 3,829,687 A | * | 8/1974 | Caldwell ....................... 376/166 |
| 3,943,362 A | | 3/1976 | Peelman |
| 4,102,185 A | * | 7/1978 | Dowling et al. ........... 73/152.05 |

(Continued)

FOREIGN PATENT DOCUMENTS

| RU | 2092876 C1 | 10/1997 |
| RU | 2262124 C1 | 10/2005 |

OTHER PUBLICATIONS

International Search Report and the Written Opinion for International Application No. PCT/US09/48810 dated Jun. 1, 2010.

(Continued)

*Primary Examiner* — David J Makiya
*Assistant Examiner* — Taeho Jo
(74) *Attorney, Agent, or Firm* — Cathy Hewitt

(57) ABSTRACT

Systems and methods for measuring neutron-induced activation gamma-rays in a subterranean formation are provided. In one example, a downhole tool for measuring neutron-induced activation gamma-rays may include a neutron source and a gamma-ray detector. The neutron source may emit neutrons according to a pulsing scheme that includes a delay between two pulses. The delay may be sufficient to allow substantially all neutron capture events due to the emitted neutrons to cease. The gamma-ray detector may be configured to detect activation gamma-rays produced when elements activated by the emitted neutrons decay to a non-radioactive state.

31 Claims, 6 Drawing Sheets

(56) References Cited

U.S. PATENT DOCUMENTS

| | | | |
|---|---|---|---|
| 4,350,888 A * | 9/1982 | Peelman | 250/269.8 |
| 4,712,007 A * | 12/1987 | Ondrik | 250/269.8 |
| 4,721,853 A * | 1/1988 | Wraight | 250/269.7 |
| 4,810,876 A | 3/1989 | Wraight et al. | |
| 4,926,044 A * | 5/1990 | Wraight | 250/264 |
| 5,219,518 A | 6/1993 | McKeon et al. | |
| 5,237,594 A | 8/1993 | Carroll | |
| 5,404,752 A * | 4/1995 | Chace et al. | 73/152.14 |
| 5,413,179 A * | 5/1995 | Scott, III | 166/308.1 |
| 5,441,110 A | 8/1995 | Scott, III | |
| 5,543,617 A * | 8/1996 | Roscoe et al. | 250/259 |
| 5,699,246 A | 12/1997 | Plasek et al. | |
| 6,125,934 A * | 10/2000 | Lenn et al. | 166/250.12 |
| 6,150,655 A * | 11/2000 | Odom et al. | 250/269.6 |
| 6,703,606 B2 | 3/2004 | Adolph | |
| 7,365,307 B2 * | 4/2008 | Stoller et al. | 250/269.2 |
| 7,365,308 B2 * | 4/2008 | Trcka et al. | 250/269.6 |
| 7,366,615 B2 | 4/2008 | Herron et al. | |
| 2002/0170348 A1 | 11/2002 | Roscoe et al. | |
| 2005/0121606 A1 * | 6/2005 | Gilchrist et al. | 250/269.1 |
| 2005/0139759 A1 | 6/2005 | Pitts et al. | |
| 2005/0284626 A1 * | 12/2005 | Riley et al. | 166/250.01 |
| 2006/0033023 A1 | 2/2006 | Pemper et al. | |
| 2006/0180754 A1 * | 8/2006 | Edwards et al. | 250/269.3 |
| 2006/0226351 A1 * | 10/2006 | Stoller et al. | 250/269.1 |
| 2006/0284066 A1 * | 12/2006 | Jacobson | 250/269.6 |
| 2007/0034373 A1 | 2/2007 | McDaniel et al. | |
| 2008/0251710 A1 * | 10/2008 | Riley et al. | 250/269.7 |
| 2009/0045329 A1 * | 2/2009 | Stoller | 250/269.4 |
| 2009/0205825 A1 * | 8/2009 | Smith et al. | 166/280.1 |

OTHER PUBLICATIONS

Russian Office Action for Russian Patent Application No. 2011103563 dated Feb. 6, 2013.

* cited by examiner

DOWNHOLE NEUTRON ACTIVATION MEASUREMENT

RELATED APPLICATIONS

This application claims the benefit of U.S. Provisional Application No. 61/077,524 filed Jul. 2, 2008.

BACKGROUND

The present disclosure relates generally to well logging with neutron-induced gamma-rays and, more particularly, to well logging with neutron-induced activation gamma-rays.

Using nuclear downhole tools, the elemental composition of a subterranean formation may be determined in a variety of ways. An indirect determination of formation lithology may be obtained using information from density and photoelectric effect (PEF) measurements from gamma-ray scattering in the formation. A direct detection of formation elements may be obtained by detecting neutron-induced gamma-rays. Neutron-induced gamma-rays may be created when a neutron source emits neutrons into a formation, which may interact with formation elements through inelastic scattering, high-energy nuclear reactions, or neutron capture.

As a result of inelastic or capture reactions, certain formation nuclei may become radioactive. Each radioactive isotope in the formation may have a characteristic half-life and a characteristic decay path to a non-radioactive element. The decay of most radioactive elements may be accompanied by the emission of one or more characteristic gamma-rays. These characteristic gamma-rays may be used to identify the element of the formation that is decaying, and thus may indicate a unique formation element that has been activated by inelastic scattering or neutron capture.

Various formation measurements may be obtained based on the above-described nuclear reactions. For example, fracture height determination in a formation may be undertaken by injecting radioactive tracer elements into a formation with fracture fluid and proppant, subsequently measuring characteristic gamma-rays emitted by the tracer. However, the use of a radioactive tracer may introduce a number of regulatory, environmental, and other challenges, as the radioactive tracer may be in liquid form and thus easily dispersible. As such, certain techniques have been developed to avoid the use of radioactive tracer in fracture height determination. These techniques may involve the injection of an inert liquid tracer into the formation, which may be subsequently bombarded with neutron radiation to activate the tracer in the liquid. In carrying out these techniques, however, the source of the activating neutron radiation may be moved away from the point of measurement, and the activation radiation may be measured at a later time when a gamma-ray detector or other detector passes by this point. In certain cases, the intervening time between activation and measurement may allow materials in the tracer-containing fracture fluid to move, which may result in an incorrect interpretation of a formation fracture or other formation properties.

SUMMARY

Certain aspects commensurate in scope with the originally claimed embodiments are set forth below. It should be understood that these aspects are presented merely to provide the reader with a brief summary of certain forms the embodiments might take and that these aspects are not intended to limit the scope of the embodiments. Indeed, the embodiments may encompass a variety of aspects that may not be set forth below.

Embodiments of the presently disclosed subject matter relate generally to systems and methods for measuring neutron-induced activation gamma-rays. For example, a downhole tool for measuring neutron-induced activation gamma-rays may include a neutron source and a gamma-ray detector. The neutron source may emit neutrons according to a pulsing scheme that includes a delay between two pulses. The delay may be sufficient to allow substantially all neutron capture events due to the emitted neutrons to cease. The gamma-ray detector may be configured to detect activation gamma-rays produced when elements activated by the emitted neutrons decay to a non-radioactive state.

BRIEF DESCRIPTION OF THE DRAWINGS

Advantages of the present disclosure may become apparent upon reading the following detailed description and upon reference to the drawings in which.

DETAILED DESCRIPTION OF SPECIFIC EMBODIMENTS

One or more specific embodiments are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the presently disclosed subject matter relate generally to systems and methods for neutron-induced gamma-ray well logging. In particular, the presently disclosed subject matter relates to activating nuclei of a subterranean formation by bombarding the formation with neutrons, which may thereafter emit gamma-rays ("activation gamma-rays") having characteristic spectra. Unlike other techniques, the presently disclosed subject matter may involve bombarding the subterranean formation with neutrons using a neutron pulsing scheme that includes a specific delay between pulses.

Using such a neutron pulsing scheme, neutrons may be emitted into the formation for a specific amount of time, during which the formation nuclei may become activated by inelastic scattering events and/or neutron capture events. These events may produce "inelastic gamma-rays" and "neutron capture gamma-rays," respectively, while the neutrons are being emitted into the formation and for a short time afterward. The presence of the delay in the neutron pulsing scheme may allow time for the inelastic gamma-rays and neutron capture gamma-rays to die away, leaving substantially only the activation gamma-rays from the activated formation nuclei. The activation gamma-rays may then be detected during the delay, rather than at a later time when the neutron source has been moved away. Additionally or alternatively, the presently disclosed subject matter may also enable the measurement of inelastic gamma-rays and/or neutron capture gamma-rays in conjunction with the activation gamma-rays.

Figure 1:
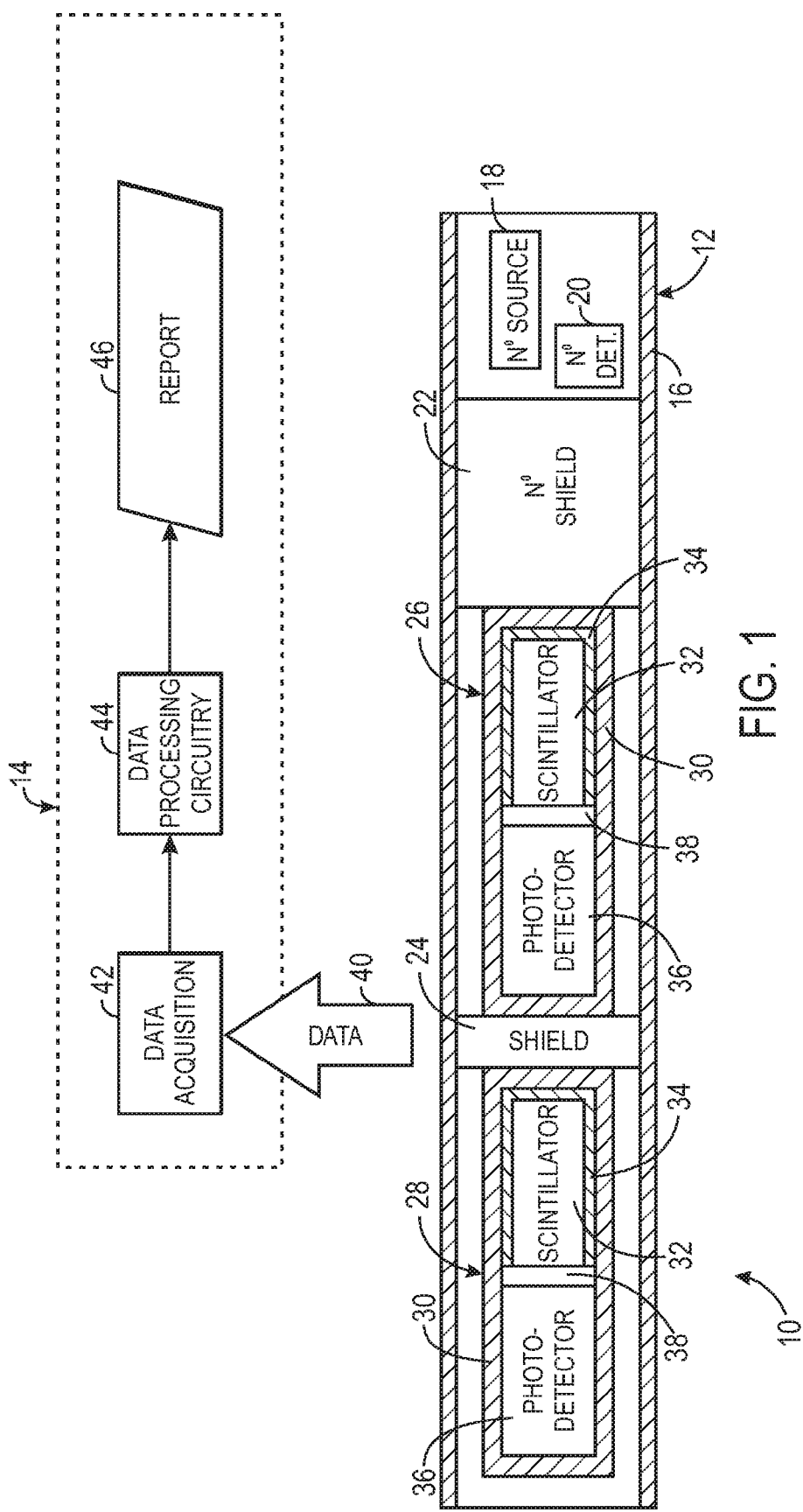
FIG. 1 is a schematic block diagram of a system including a downhole tool and data processing circuitry for measuring neutron-induced gamma-rays, in accordance with an embodiment.

With the foregoing in mind, FIG. 1 illustrates a system 10 for determining subterranean formation properties using activation gamma-rays that includes a downhole tool 12 and a data processing system 14. By way of example, the downhole tool 12 may be a slickline or wireline tool for logging an existing well, or may be installed in a borehole assembly for logging while drilling (LWD). The data processing system 14 may be incorporated into the downhole tool 12 or may be at a remote location. The downhole tool 12 may be surrounded by a housing 16.

The downhole tool 12 may include a neutron source 18 configured to emit neutrons into a formation according to a neutron pulsing scheme, as described below. By way of example, the neutron source 18 may be an electronic neutron source, such as a Minitron™ by Schlumberger Technology Corporation, which may produce pulses of neutrons through d-D and/or d-T reactions. In some embodiments, a neutron monitor 20 may monitor neutron emissions from the neutron source 18 to more precisely observe the quantity of neutrons emitted by the neutron source 18. The neutron monitor 20 may be a plastic scintillator and photomultiplier that may primarily detect unscattered neutrons directly from the neutron source 18, and may provide a count rate signal proportional to the neutron output rate from the neutron source 18. A neutron shield 22 may separate the neutron source 18 from various detectors in the downhole tool 12. A similar shield 24, which may contain elements such as lead, may prevent gamma-rays from traveling between the various detectors of the downhole tool 12.

The downhole tool 12 may include one or more gamma-ray detectors, and may include three or more gamma-ray detectors. The downhole tool 12 illustrated in FIG. 1 includes two gamma-ray detectors 26 and 28. The relative positions of the gamma-ray detectors 26 and/or 28 in the downhole tool 12 may vary. In some embodiments, the gamma-ray detectors 26 and 28 may be located on opposite sides of the neutron source 18.

The gamma-ray detectors 26 and/or 28 may be contained in respective housings 30. Scintillator crystals 32 in the gamma-ray detectors 26 and/or 28 may enable detection counts or spectra of gamma-rays by producing light when gamma-rays scatter or are captured in the scintillator crystals 32. The scintillator crystals 32 may be inorganic scintillation detectors containing, for example, NaI(Tl), $LaCl_3$, $LaBr_3$, BGO, GSO, YAP, and/or other suitable materials. Housings 34 may surround the scintillator crystals 32. Photodetectors 36 may detect light emitted by the scintillator crystals 32 when a gamma-ray is absorbed and the light has passed through an optical window 38. The gamma-ray detectors 26 and/or 28 may be configured to obtain a gamma-ray count and/or gamma-ray spectra.

The signals from the neutron monitor 20 and gamma-ray detectors 26 and/or 28 may be transmitted to the data processing system 14 as data 40. The data processing system 14 may include a general-purpose computer, such as a personal computer, configured to run a variety of software, including software implementing all or part of the present techniques. Alternatively, the data processing system 14 may include, among other things, a mainframe computer, a distributed computing system, or an application-specific computer or workstation configured to implement all or part of the present technique based on specialized software and/or hardware provided as part of the system. Further, the data processing system 14 may include either a single processor or a plurality of processors to facilitate implementation of the presently disclosed functionality. Processing may be done at least in part by an embedded processor in the downhole tool.

In general, the data processing system 14 may include data processing circuitry 44, which may be a microcontroller or microprocessor, such as a central processing unit (CPU), which may execute various routines and processing functions. For example, the data processing circuitry 44 may execute various operating system instructions as well as software routines configured to effect certain processes and stored in or provided by a manufacture including a computer readable-medium, such as a memory device (e.g., a random access memory (RAM) of a personal computer) or one or more mass storage devices (e.g., an internal or external hard drive, a solid-state storage device, CD-ROM, DVD, or other storage device). In addition, the data processing circuitry 44 may process data provided as inputs for various routines or software programs, including the data 40.

Such data associated with the present techniques may be stored in, or provided by, the memory or mass storage device of the data processing system 14. Alternatively, such data may be provided to the data processing circuitry 44 of the data processing system 14 via one or more input devices. In one embodiment, data acquisition circuitry 42 may represent one such input device; however, the input devices may also include manual input devices, such as a keyboard, a mouse, or the like. In addition, the input devices may include a network device, such as a wired or wireless Ethernet card, a wireless network adapter, or any of various ports or devices configured to facilitate communication with other devices via any suitable communications network, such as a local area network or the Internet. Through such a network device, the data processing system 14 may exchange data and communicate with other networked electronic systems, whether proximate to or remote from the system. The network may include various components that facilitate communication, including switches, routers, servers or other computers, network adapters, communications cables, and so forth.

The downhole tool 12 may transmit the data 40 to the data acquisition circuitry 42 of the data processing system 14 via, for example, a telemetry system communication downlink or a communication cable. After receiving the data 40, the data acquisition circuitry 42 may transmit the data 40 to data processing circuitry 44. In accordance with one or more stored routines, the data processing circuitry 44 may process the data 40 to ascertain one or more properties of a subterranean formation surrounding the downhole tool 12. Such processing may involve, for example, one or more techniques for determining a formation property based on activation gamma-rays and/or inelastic or neutron capture gamma-rays. The data processing circuitry 44 may thereafter output a report 46 indicating the one or more ascertained properties of the formation. The report 46 may be stored in memory or may be provided to an operator via one or more output devices, such as an electronic display and/or a printer. By way of example, the data processing circuitry 44 may determine a composition of a subterranean formation based on activation gamma-rays, using such techniques as discussed in U.S. Pat. No. 4,810,876, "LOGGING APPARATUS AND METHOD FOR DETERMINING ABSOLUTE ELEMENTAL CONCENTRATIONS OF SUBSURFACE FORMATIONS," and/or U.S. Pat. No. 5,237,594, "NUCLEAR ACTIVATION METHOD AND APPARATUS FOR DETECTING AND QUANTIFYING EARTH ELEMENTS," both of which are assigned to Schlumberger Technology Corporation and incorporated by reference herein in their entirety.

Figure 2:
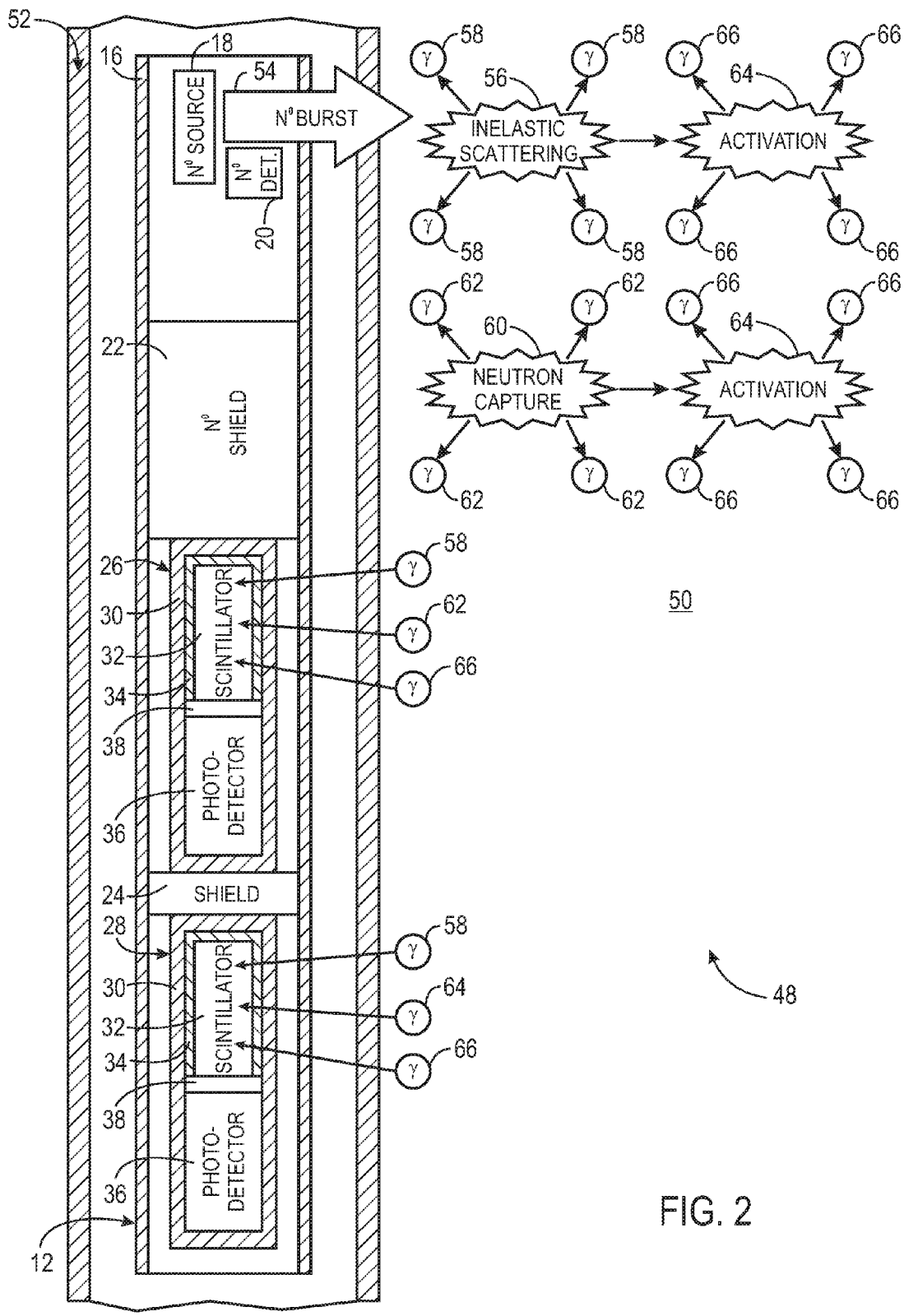
FIG. 2 is a schematic block diagram of a well logging operation using the downhole tool of FIG. 1, in accordance with an embodiment.

FIG. 2 illustrates a neutron-induced gamma-ray well-logging operation 48, which involves the placement of the downhole tool 12 into a surrounding subterranean formation 50. In the operation 48 depicted in FIG. 2, the downhole tool 12 has been lowered into an existing well 52. The well-logging operation 48 may begin when the neutron source 18 outputs a series of neutron bursts 54 according to a neutron pulsing scheme incorporating an activation delay. Suitable neutron pulsing schemes are discussed in greater detail below. If the neutron source 18 emits neutrons produced via d-T reactions, the neutron burst 54 may include neutrons of approximately 14.1 MeV. These 14.1 MeV neutrons may collide with nuclei in the surrounding formation 50 through inelastic scattering events 56, which may produce inelastic gamma-rays 58 and may cause the neutrons of the burst of neutrons 54 to lose energy. As the neutrons of the burst of neutrons 54 lose energy, the neutrons may be absorbed by formation 50 nuclei in neutron capture events 60, which may produce neutron capture gamma-rays 62.

Both the inelastic scattering events 56 and the neutron capture events 60 may cause the formation 50 elements involved in the events 56 and/or 60 to activate 64, or become radioactive. Each of the activated 64 radioactive isotopes may have a characteristic half-life and a characteristic decay path to a non-radioactive element. In particular, the decay of most radioactive elements of the formation 50 may be accompanied by the emission of one or more characteristic activation gamma-rays 66. Because the activation gamma-rays 66 may correspond to the element that is decaying, by detecting the activation gamma-rays 66, unique formation 50 elements may be identified.

If the neutron source 18 emits neutrons produced via d-D reactions, the neutron burst 54 may include neutrons of approximately 2.5 MeV. These 2.5 MeV neutrons may not cause inelastic scattering events 56, which may require neutrons of higher energy, but may cause neutron capture events 60. Thus, the activation 64 that occurs, when the neutron burst 54 includes substantially only neutrons produced via d-D reactions, may result only from neutron capture events 60. Since certain formation 50 elements may be activated 64 only through neutron capture events 60, and certain other formation 50 elements may be activated only through inelastic scattering events 56, certain techniques described herein may involve multiple passes of the downhole tool 12 through the formation 50, during which neutron bursts 54 of different energy levels are emitted.

The inelastic gamma-rays 58, neutron capture gamma-rays 62, and/or activation gamma-rays 66 may be detected by the gamma-ray detectors 26 and/or 28. As noted briefly above, the gamma-rays 58, 62, and 66 may be produced at different points in time after the neutron burst 54. In particular, during and immediately after the neutron burst 54, the gamma-ray detectors 26 and/or 28 may detect mostly inelastic gamma-rays 58 and neutron capture gamma-rays 62. However, following a sufficient delay after the neutron burst 54, the gamma-ray detectors 26 and/or 28 may detect substantially only activation gamma-rays 66, since the inelastic scattering events 56 and neutron capture events 60 may largely cease.

For this reason, among others, the neutron pulsing scheme used by the neutron source 18 for emitting neutrons into the formation 50 may include a delay between neutron bursts 54. The delay between neutron bursts 54 may be sufficient to permit substantially all inelastic gamma-rays 58 and neutron capture gamma-rays 62 to die away (e.g., greater than 2 ms), leaving among the neutron-induced gamma-rays substantially only activation gamma-rays 66. A neutron pulsing scheme that incorporates such a delay between pulses may be described in a neutron pulse diagram 68, shown in FIG. 3. The neutron pulse diagram 68 includes an ordinate 70 indicating whether the neutron source 18 is set to ON or OFF, and an abscissa 72 indicating time in unit of seconds (s).

Figure 3:
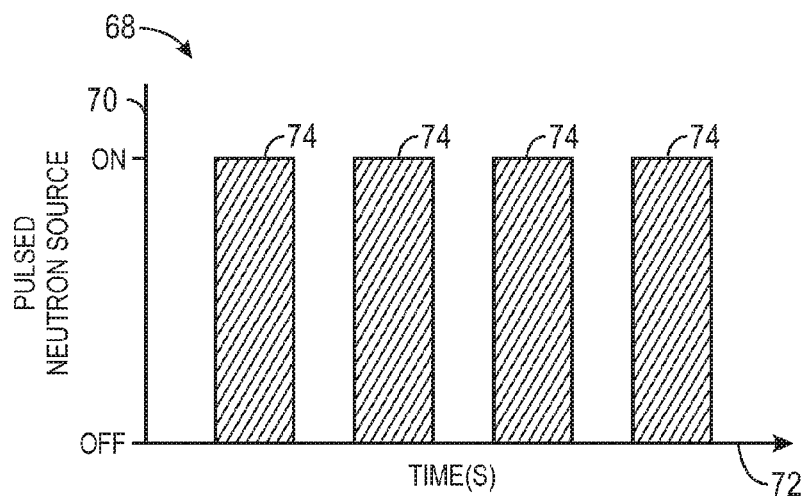
FIG. 3 is a neutron pulse diagram illustrating a neutron pulsing scheme for the downhole tool of FIG. 1, in accordance with an embodiment.

In the neutron pulse diagram 68 of FIG. 3, the neutron bursts 54 may be pulsed from the neutron source 18 in a relatively slow sequence. By way of example, a neutron ON time for a pulse 74 of the neutron pulsing scheme may be approximately one second, and the neutron OFF time between pulses 74 may also be on the order of approximately one second. The neutron OFF time between the neutron pulses 74 may be shorter or longer than the neutron ON time for the neutron pulses 74. By way of example, if a slower logging speed is chosen, the neutron ON and OFF times may be lengthened. Moreover, the neutrons need not be emitted at a constant rate during each neutron pulse 74. Rather, a microbursting scheme, such as those used in C/O logging, Sigma, or spectroscopy logging may be employed. As such, each of the neutron pulses 74 may be subdivided into multiple neutron microbursts and pauses representing such a microbursting scheme, as discussed below. Moreover, more than one distinct microbursting scheme may be employed in the neutron pulsing scheme described by the neutron pulse diagram 68. In particular, one neutron pulse 74 may be subdivided into a microbursts and pauses representing a first bursting scheme, and another neutron pulse 74 may be subdivided into a microbursts and pauses representing a second bursting scheme.

Figure 4:
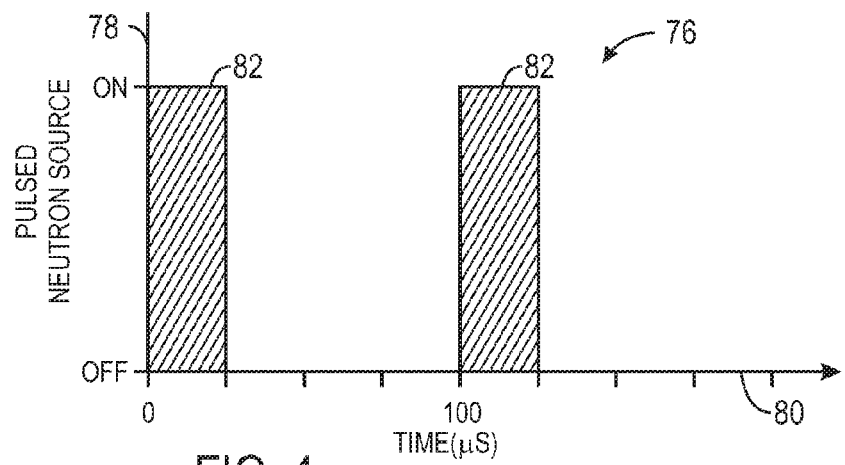
FIG. 4 is a neutron pulse diagram illustrating a microbursting scheme for use in the neutron pulsing scheme of FIG. 3, in accordance with an embodiment.

FIG. 4 is a neutron pulse diagram 76 illustrating a microbursting scheme that may be employed within pulses 74 of a neutron pulsing scheme, such as the neutron pulsing scheme described by the neutron pulse diagram 68 of FIG. 3. The neutron pulse diagram 76 includes an ordinate 78, which indicates whether the neutron source 18 is set to ON or OFF, and an ordinate 80, which indicates time in units of microseconds (µs). As shown by the neutron pulse diagram 76, each neutron microburst 82 of ON time may have a length of approximately 20 µs, which may be followed by approximately 80 µs of OFF time. This sequence may be repeated rapidly throughout a pulse 74. Alternative microbursting schemes may be employed. Such schemes may include the dual-burst scheme described in U.S. Pat. No. 4,926,044, "THERMAL DECAY TIME LOGGING METHOD AND APPARATUS", or the scheme used in the EcoScope tool by Schlumberger and described in U.S. Pat. No. 6,703,606 "NEUTRON BURST TIMING METHOD AND SYSTEM FOR MULTIPLE MEASUREMENT PULSED NEUTRON FORMATION EVALUATION." Both of the above-referenced patents are assigned to Schlumberger Technology Corporation and are incorporated herein by reference in their entirety.

It should be understood that such microbursting schemes are intended to be exemplary and not exhaustive, and that any number of microbursting schemes may be employed during the neutron pulse 74. Moreover, the microbursting scheme employed during the neutron pulse 74 may be used to obtain additional measurements, such as inelastic gamma-ray spectroscopy, capture gamma-ray spectroscopy, and/or Sigma measurements. The particular measurements that may be obtained may vary depending on the particular microbursting scheme employed during the neutron pulse 74.

Figure 5:
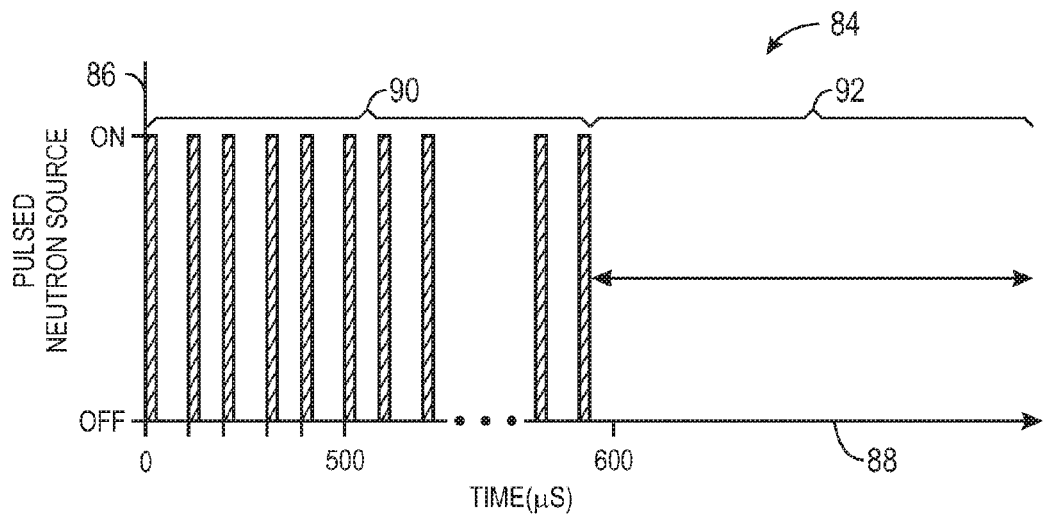
FIG. 5 is a neutron pulse diagram illustrating another neutron pulsing scheme, in accordance with an embodiment.

FIG. 5 is a neutron pulse diagram 84 describing another neutron pulsing scheme for use by the neutron source 18 in the downhole tool 12. The neutron pulse diagram 84 includes an ordinate 86, which indicates whether the neutron source 18 is set to ON or OFF, and an ordinate 88, which indicates time in units of microseconds (µs). The neutron pulse diagram 84 may be divided into an ON segment 90 and an OFF segment 92. During the ON segment 90, microbursts of neutrons may be emitted as the neutron source 18 is switched ON and OFF approximately 600 times with a period of 100 µs. Thus, the neutron source 18 may be ON for 20 µs, followed by a pause of approximately 80 µs, for each microburst during the ON segment 90. During the OFF segment 92, which may last between approximately 2 ms to 100 ms, the thermal neutron population may disappear completely, such that substantially no neutron capture gamma-rays 62 may be observed by the end of the OFF segment 92.

Figure 6:
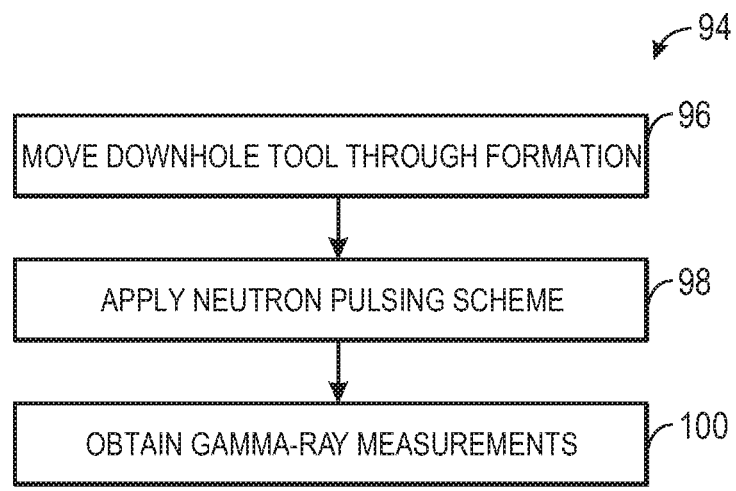
FIG. 6 is a flowchart describing an embodiment of a method for obtaining gamma-ray measurements for determining a characteristic of a subterranean formation using the downhole tool of FIG. 1, in accordance with an embodiment.

FIG. 6 is a flowchart 94 describing an embodiment of a method for obtaining gamma-ray measurements due to activation, neutron capture, and/or inelastic scattering using the downhole tool 12. In a first step 96, the downhole tool 12 may be moved through the formation 50 via the well 52. As described above, the downhole tool 12 may move through the well 52 on a wireline, a slickline, or as part of a borehole assembly (BHA). The downhole tool 12 may be moved through the formation 50 at a predetermined logging speed, or the logging speed may vary based on the particular neutron pulsing scheme applied or based on the resulting gamma-ray measurements.

In step 98, the neutron source 18 may emit neutrons according to a particular neutron pulsing scheme. The neutron pulsing scheme may include, for example, any of the neutron pulsing schemes or neutron microburst schemes described above with reference to FIGS. 3-5, any suitable variations thereof, or any neutron pulsing scheme incorporating a sufficient delay to allow the detection of activation gamma-rays 66. The neutron pulsing scheme applied during step 98 may include neutron pulses 74 and delays short enough such that, following activation 64 of formation 50 nuclei, the gamma-ray detectors 26 and/or 28 may not have moved substantially.

The neutron pulsing scheme applied in step 98 may or may not be adapted to the logging speed of step 96. In one example, if the neutron pulsing scheme is adapted to the logging speed, neutron pulses 74 and OFF times between the neutron pulses 74 may be proportional to the movement rate of the downhole tool 12 through the formation 50. In another example, if the downhole tool 12 becomes stationary in the formation 50, the neutron pulsing scheme applied in step 98 may be different from a neutron pulsing scheme applied when the downhole tool 12 is currently moving through the formation. If the neutron pulsing scheme applied in step 98 is not adapted to the logging speed, the neutron pulsing scheme may be a single, predetermined neutron pulsing scheme configured to effectively activate 64 the formation 50 while permitting sufficient time for the detection of resulting activation gamma-rays 66. By way of example, such a predetermined neutron pulsing scheme may involve multiple neutron pulses 74 of various duration and/or including various microbursting schemes. The single predetermined neutron pulsing scheme may include sufficient variation to effectively enable a range of logging speeds for activation gamma-ray 66 logging. For example, the predetermined neutron pulsing scheme may include certain pulses 74 with corresponding delays tailored for measurements at certain logging speeds, and may include other pulses 74 with corresponding delays tailored for stationary measurements.

As described above with reference to FIG. 1, the neutron source 18 may be capable of generating neutrons at one or more energy levels. For example, the neutron source 18 may be a d-T neutron generator, capable of emitting 14.1 MeV neutrons, or a d-D neutron generator, capable of emitting 2.5 MeV neutrons. As such, the neutron pulsing scheme applied in step 98 may involve neutron pulses or microbursts of substantially only 14.1 MeV neutrons, of substantially only 2.5 MeV neutrons, or of both 14.1 MeV neutrons and 2.5 MeV neutrons. As described above with reference to FIG. 2, when a neutron burst 54 that occurs during a neutron pulse 74 includes the 14.1 MeV neutrons, inelastic scattering events 56 may occur in the formation 50, producing inelastic gamma-rays 58, and providing certain formation 50 elements a path to activation 64.

If substantially only 2.5 MeV neutrons are emitted in a neutron burst 54 during a neutron pulse 74 of the pulsing scheme applied in step 98, certain specific elements of the formation 50 may be determined more easily. At 2.5 MeV, the neutron burst 54 may produce almost no inelastic scattering events 56, and thus neutron capture events 60 may dominate. Thus, the activated 64 isotopes may be limited almost entirely to those activated 64 by thermal neutron capture events 60. This may eliminate, for example, the production of $^{28}$Al through the high-energy reaction $^{28}$Si(n,p)$^{28}$Al. As a result, the activation 64 of $^{27}$Al through the $^{27}$Al(n,γ)$^{28}$A.l thermal capture reaction 60 may be unambiguously detected.

The neutron pulsing scheme applied in step 98 may also involve the use of a neutron source 18 that can produce neutrons through d-T and d-D reactions in a separate controlled manner. This may allow the separation of activation 64 caused by fast neutrons of approximately 14.1 MeV (via inelastic scattering events 56) and thermal neutrons of approximately 2.5 MeV (via neutron capture events 60). The activation 64 may be accomplished using alternate pulses 74 or alternate bursts 54 of these low and high energy neutrons. Such a neutron generator 18 may also emit fast and thermal neutrons in parallel, as disclosed in U.S. Patent Application Serial No. 2007/839757 "DOWNHOLE TOOLS HAVING COMBINED D-D AND D-T NEUTRON GENERATORS" assigned to Schlumberger Technology Corporation and incorporated by reference herein in its entirety.

In step 100, based on the neutron pulsing scheme applied in step 98, resulting gamma-rays 58, 62, and/or 66 may be detected due to inelastic scattering events 56, neutron capture events 60, and/or activation events 64, respectively. For example, if the neutron pulsing scheme applied in step 98 is similar to the neutron pulsing scheme illustrated in FIG. 5 and the neutron source 18 emits neutrons of approximately 14.1 MeV, the gamma-ray detectors 26 and/or 28 may detect inelastic gamma-rays 58 and/or neutron capture gamma-rays 62 throughout the ON segment 90. Meanwhile, during the OFF segment 92, after the inelastic gamma-rays 58 and neutron capture gamma-rays 62 have died away, the gamma-ray detectors 26 and/or 28 may detect substantially only activation gamma-rays 66. Due to the pulsing scheme applied in step 98, the gamma-ray detectors 26 and/or 28 may detect the gamma-rays 58, 62, and/or 66 before the downhole tool 12 has moved away from the location in the formation 50 where the neutrons were emitted. Thus, the downhole tool 12 may gain measurements of inelastic gamma-rays 58 and/or neutron capture gamma-rays 62 substantially simultaneously with activation gamma-rays 66.

It should be understood that, in step 100, the gamma-ray detectors 26 and/or 28 may obtain gamma-ray counts and/or measure spectra of the gamma-rays 58, 62, and/or 66. In this way, the neutron-induced inelastic gamma-ray 58 and/or neutron capture gamma-ray 62 counts or spectra may be obtained in concert with activation gamma-ray 66 counts or spectra. For example, the obtained gamma-ray 58 and/or 62 spectra may be processed in the data processing system 14 to enhance and/or complement the information of the activation gamma-ray 66 spectra. Additionally, if the neutron monitor 20 is present in the downhole tool 12, the measured gamma-ray 58, 62, and 66 intensity may be related to the total neutron output during the neutron pulsing scheme applied in step 98.

Depending on the neutron pulsing scheme applied in step 98, in step 100, the macroscopic formation capture cross section (Sigma) may also be measured. Neutron pulsing schemes suitable for a Sigma measurement are discussed briefly above with reference to FIG. 4. The Sigma measurement may provide additional information and may be important for various environmental corrections, and particularly for the measurement of activation gamma-rays 66.

Figure 7:
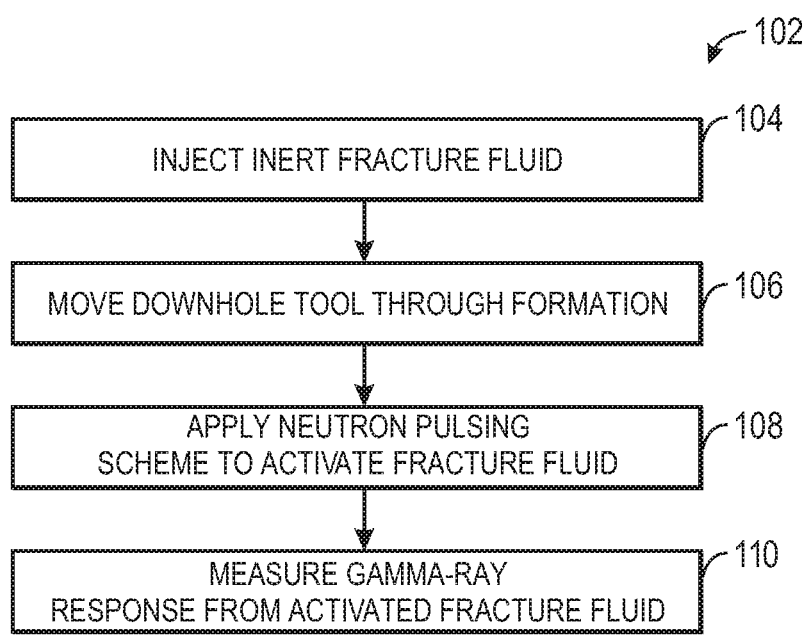
FIG. 7 is flowchart of an embodiment of a method for obtaining gamma-ray measurements for a fracture height determination using the downhole tool of FIG. 1, in accordance with an embodiment.

FIG. 7 is a flowchart 102 of an embodiment of a method for obtaining activation gamma-ray 66 measurements for fracture height determination in the formation 50. In a first step 104, a fracture fluid containing an inert tracer material may be injected into fractures inside a formation 50 proximate to a well, such as the well 52. In step 106, the downhole tool 12 may be moved through the formation via the well 52.

In step 108, a neutron pulsing scheme may be applied to activate 64 the inert tracer materials in the fracture fluid. The neutron pulsing scheme applied in step 108 may be any of the neutron pulsing schemes described above with reference to FIGS. 3-5, as well as any variation of the neutron pulsing schemes described above with reference to step 98 of FIG. 6. In particular, in one embodiment, the neutron pulsing scheme 108 may involve emitting the neutron burst 54 using only a d-D neutron generator, which may emit substantially only 2.5 MeV neutrons. The use of low-energy neutrons from the d-D reaction may be useful for the detection of non radioactive tracers that may be activated 64 by thermal neutron capture events 60, but not inelastic scattering events 56.

In step 110, the gamma-ray detectors 26 and/or 28 may record the gamma-ray response from the activated fracture fluid. It should be appreciated that the activation gamma-rays 66 detected from the activated fracture fluid may be used for determination of fracture heights in the formation 50.

Figure 8:
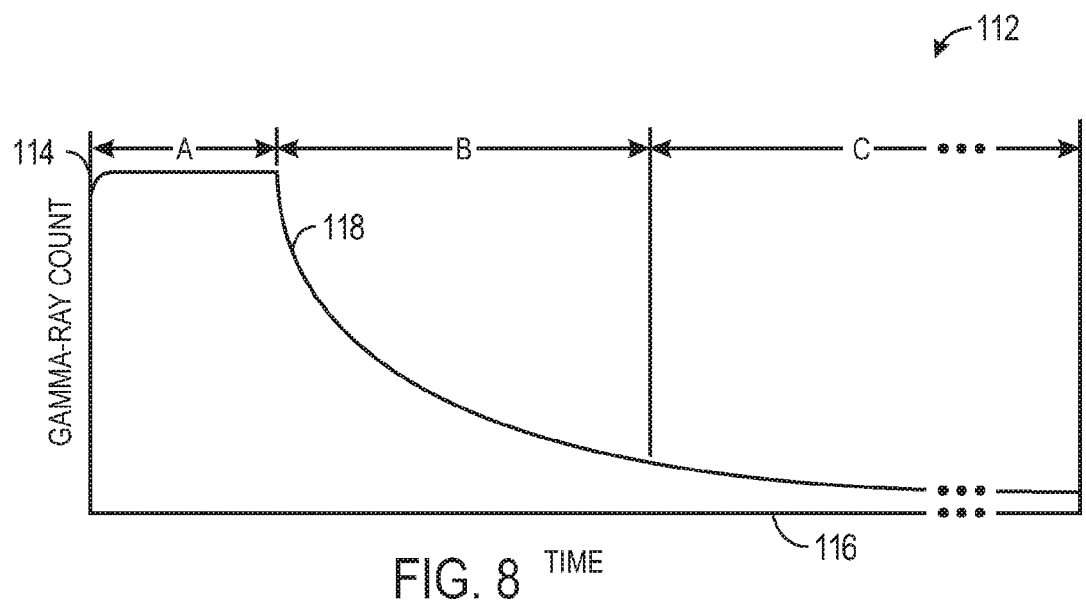
FIG. 8 is a plot illustrating a relative gamma-ray count over time using the downhole tool of FIG. 1, in accordance with an embodiment.

FIG. 8 is a plot 112 representing an exemplary gamma-ray response that may result after bombarding the formation 50 with neutrons emitted according to one of the neutron pulsing schemes described herein. By way of example, the exemplary gamma-ray response of the plot 112 may represent a count of gamma-rays obtained during step 100 of the flowchart 94 or during step 110 of the flowchart 102. In the plot 112, an ordinate 114 represents a relative gamma-ray count including inelastic gamma-rays 58, neutron capture gamma-rays 62, and activation gamma-rays 66. An abscissa 116 represents relative time, starting during a neutron pulse 74 and ending during a delay that follows the neutron pulse 74.

Time bins A, B, and C represent times during which only certain gamma-rays may be observed. In particular, since time bin A represents a time when the neutron source 18 is emitting neutrons into the formation 50, during time bin A, the detected gamma-rays may include mostly inelastic gamma-rays 58, but may also include some neutron capture gamma-rays 62 and activation gamma-rays 66. During time bin B, which may begin immediately after the final neutron burst 54 of a neutron pulse 74, the detected gamma-rays may include mostly neutron capture gamma-rays 62, but may also include some activation gamma-rays 66. During time bin C, which may begin following a delay sufficient to allow the neutron capture gamma-rays 62 to die away, substantially only activation gamma-rays 66 may be detected. Time bin C may be further subdivided into time bins based on the half-lives of various activated 64 isotopes of the formation 50. Each of the subdivided time bins within time bin C may correspond to certain isotopes that may be present and activated 64 in the formation 50.

Figure 9:
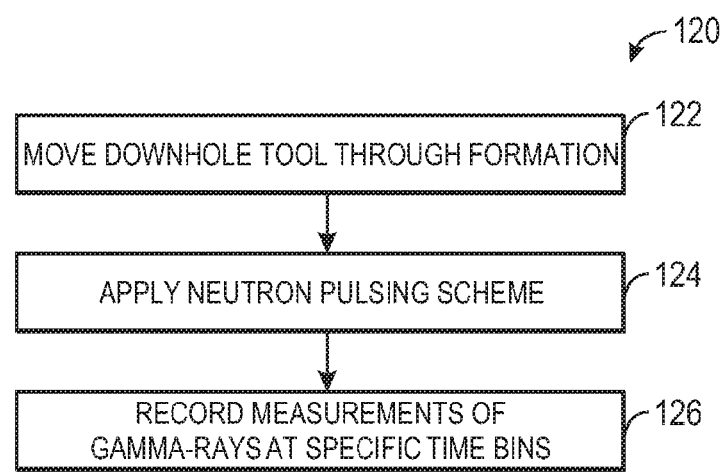
FIG. 9 is a flowchart of an embodiment of a method for obtaining gamma-ray measurements at specific times, in accordance with an embodiment.

FIG. 9 is a flowchart 120 representing an embodiment of a method for obtaining activation gamma-ray 66 measurements and storing the gamma-ray measurements into specific time bins. In this way, the temporal characteristics of the gamma-ray response described above with reference to FIG. 8 may be employed to identify the origination of certain detected gamma-rays. The method of the flowchart 120 may or may not involve the injection of an inert tracer in fracture fluid into the formation 50. In a first step 122, the downhole tool 12 may be moved through the formation 50 via the well 52 in the same manner as described in steps 96 or 106. Similarly, in step 124, one of the neutron pulsing schemes may be applied in the same manner as in steps 98 or 108.

Following the application of the neutron pulsing scheme in step 124, in step 126, the gamma-ray detectors 26 and/or 28 may detect the inelastic gamma-rays 58, neutron capture gamma-rays 62, and/or activation gamma-rays 66 that result. In particular, when the gamma-rays 58, 62, and/or 66 recorded by the gamma-ray detectors 26 and/or 28, they may be stored in particular time bins. The time bins may have equal lengths or may have lengths that vary. For example, the length of the time bins may depend on the amount of time that has passed since the last neutron burst 54 of a neutron pulse 74. Additionally or alternatively, the length of the time bins may vary depending on the logging speed of the downhole tool 12 or depending on the pulsing scheme applied during step 124. By way of example, the time bins may have relative lengths comparable to the time bins A, B, and/or C shown in FIG. 8. As another example, the lengths of the time bins corresponding to measured activation gamma-rays 66 may be shorter or longer if the pulsing scheme applied in step 124 involves primarily 2.5 MeV neutrons or 14.1 MeV, as may be suitable.

Figure 10:
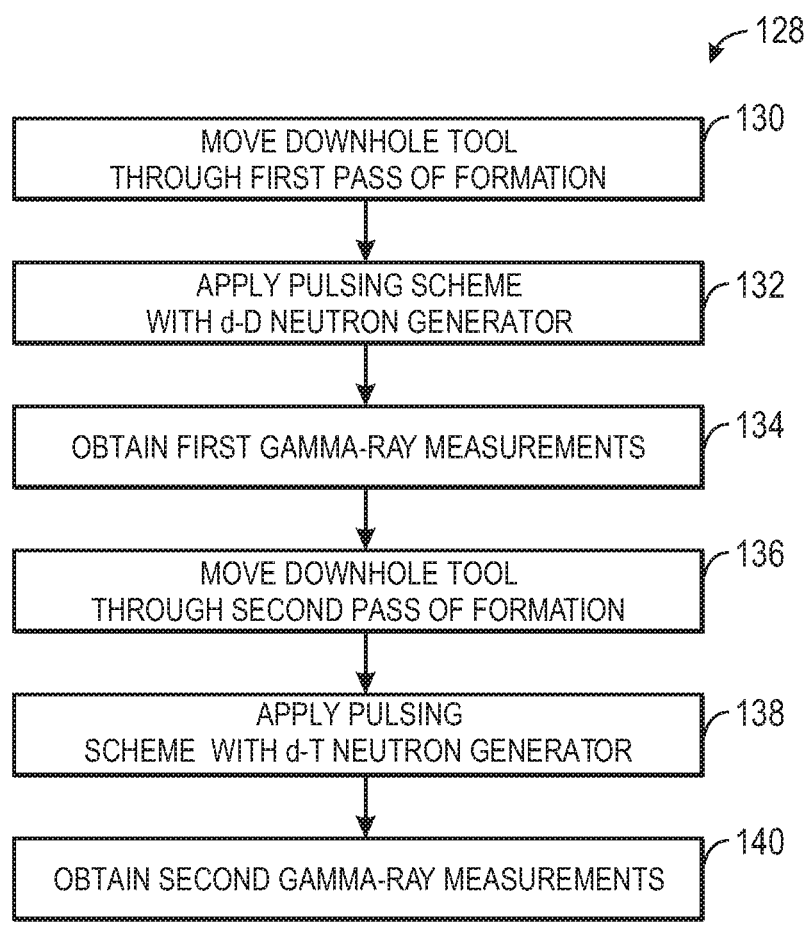
FIG. 10 is a flowchart of an embodiment of a method for obtaining neutron-induced gamma-ray measurements with neutrons supplied by d-D and d-T reactions, in accordance with an embodiment.

FIG. 10 is a flowchart 128 representing an embodiment of a method for obtaining activation gamma-ray 66 measurements using two distinct neutron energy levels. Specifically, steps 130-134 represent a first pass through the formation 50, during which substantially only 2.5 MeV neutrons may be emitted. Steps 136-140 represent a second pass through the formation 50, during which substantially only 14.1 MeV neutrons may be emitted. The method of the flowchart 120 may or may not involve the injection of an inert tracer in fracture fluid into the formation 50.

In the first step 130 of the first pass through the formation 50, the downhole tool 12 may be moved through the formation 50 via the well 52 in the same manner as described in steps 96 or 106. Similarly, in step 132, one of the neutron pulsing schemes may be applied in the same manner as in steps 98 or 108. In particular, in step 132, the neutron pulsing scheme applied in step 130 may involve emitting neutron bursts 54 using 2.5 MeV neutrons from d-D reactions. The use of low-energy neutrons from d-D reactions may be particularly useful for the detection of non-radioactive tracers that may be activated 64 by thermal neutron capture events 60, but not inelastic scattering events 56. Additionally, however, the low-energy neutrons may activate 64 only certain elements in the formation 50. For example, at 2.5 MeV, the neutron burst 54 may produce almost no inelastic scattering events 56, and thus neutron capture events 60 may dominate. As such, the activated 64 isotopes may be limited almost entirely to those activated 64 by thermal neutron capture events 60. This may eliminate, for example, the production of $^{28}$Al through the high-energy reaction $^{28}$Si(n,p)$^{28}$Al. As a result, the activation 64 of $^{27}$Al through the $^{27}$Al(n,γ)$^{28}$Al thermal capture reaction 60 may be unambiguously detected. In step 134, measurements of resulting neutron capture gamma-rays 62 and/or activation gamma-rays 66 may be obtained.

In the first step 136 of the second pass through the formation 50, the downhole tool 12 may be moved through the formation 50 via the well 52 in the same manner as described in step 130. Similarly, in step 138, one of the neutron pulsing schemes may be applied in approximately the same manner as in step 132, except that the neutron pulsing scheme applied in step 138 may involve emitting neutron bursts 54 using 14.1 MeV neutrons from d-T reactions. The 14.1 MeV neutrons may cause both inelastic scattering events 56 and neutron capture events 60. Thus, in the second pass of steps 136-140, certain formation 50 elements and/or tracer elements that may only become activated 64 via inelastic scattering events 56, which were not activated during the first pass of steps 130-134, may become activated 64. In step 140, measurements of resulting inelastic gamma-rays 58, neutron capture gamma-rays 62, and/or activation gamma-rays 66 may be obtained.

While only certain features have been illustrated and described herein, many modifications and changes will occur to those skilled in the art. It is, therefore, to be understood that the appended claims are intended to cover all such modifications and changes as fall within the true spirit of the present disclosure.

What is claimed is:

1. A downhole tool comprising:
a neutron source configured to emit neutrons according to a pulsing scheme, wherein the pulsing scheme includes a delay between two pulses, wherein the delay is sufficient to allow neutron capture events due to the emitted neutrons to cease, wherein the delay is configured to vary based upon a logging speed of the downhole tool; and
a gamma-ray detector configured to detect activation gamma-rays produced when elements activated by the emitted neutrons decay to a non-radioactive state.

2. The downhole tool of claim 1, wherein the delay is greater than or equal to approximately 1 ms.

3. The downhole tool of claim 1, wherein the delay is greater than approximately 1 s.

4. The downhole tool of claim 1, wherein the pulsing scheme is configured to vary depending on a logging speed of the downhole tool.

5. The downhole tool of claim 1, wherein the pulsing scheme is configured to comprise a plurality of predetermined burst patterns for a plurality of logging speeds.

6. The downhole tool of claim 1, wherein the pulsing scheme is configured such that one of the pulses of the pulsing scheme is subdivided into a plurality of microbursts.

7. The downhole tool of claim 6, wherein the plurality of microbursts comprises a carbon/oxygen (C/O) microbursting scheme, a gamma-ray spectroscopy microbursting scheme, a dual-burst microbursting scheme, or a Sigma measurement microbursting scheme, or any combination thereof.

8. The downhole tool of claim 6, wherein the plurality of microbursts comprises less than or equal to approximately 50% of the one of the pulses of the pulsing scheme and wherein a plurality of delays between the plurality of microbursts comprises greater than or equal to approximately 50% of the one of the pulses of the pulsing scheme.

9. A downhole tool for use in a subterranean formation, comprising: a neutron source configured to emit neutrons into the subterranean formation in pulses separated by a delay of greater than 2 ms, the delay varying based upon a logging speed of the downhole tool; and a gamma-ray detector configured to detect activation gamma-rays and either or both inelastic gamma-rays or neutron capture gamma-rays resulting from interactions between the emitted neutrons and the subterranean formation.

10. The downhole tool of claim 9, wherein the neutron source comprises a d-D neutron generator or a d-T neutron generator, or a combination thereof.

11. The downhole tool of claim 9, wherein the gamma-ray detector is configured for detecting counts of the activation gamma-rays or detecting spectra of the activation gamma-rays, or any combination thereof.

12. The downhole tool of claim 9, comprising a second gamma-ray detector, wherein the neutron source is disposed in the downhole tool between the gamma-ray detector and the second gamma-ray detector.

13. The downhole tool of claim 9, comprising a second gamma-ray detector, wherein the second gamma-ray detector is disposed in the downhole tool between the gamma-ray detector and the neutron source.

14. A method comprising:
injecting fracture fluid containing an inert tracer material into a subterranean formation, wherein the inert tracer material is configured to be activated through thermal neutron capture;
emitting neutrons into the subterranean formation to activate the tracer material using a neutron generator configured to emit neutrons according to a pulsing scheme that includes a delay between pulses of greater than 2 ms, the delay varying based upon a logging speed, wherein the emitted neutrons have energies sufficient to cause neutron capture events but not to cause inelastic scattering events; and
detecting activation gamma-rays from the activated tracer material using a gamma-ray detector.

15. The method of claim 14, wherein the activation gamma-rays are detected at least approximately 2 ms after an emitted neutron pulse has ended.

16. The method of claim 14, comprising detecting either or both inelastic gamma-rays or neutron capture gamma-rays resulting from interactions between the emitted neutrons and the subterranean formation or the tracer material.

17. A method comprising:
emitting neutrons produced by d-D reactions into a subterranean formation to activate formation elements with neutron capture events, wherein the neutrons are emitted according to a pulsing scheme that includes a delay between pulses of greater than 2 ms, the delay varying based upon a logging speed;
detecting capture activation gamma-rays from the formation elements activated by the neutron capture events using a gamma-ray detector;
emitting neutrons produced by d-T reactions into a subterranean formation to activate formation elements with inelastic scattering events and secondary neutron capture events, wherein the neutrons are emitted according to a pulsing scheme that includes a delay between pulses of greater than 2 ms; and
detecting inelastic and capture activation gamma-rays from the formation elements activated by the inelastic scattering events and the secondary neutron capture events using the gamma-ray detector.

18. The method of claim 17, comprising detecting neutron capture gamma-rays produced by the neutron capture events after emitting the neutrons produced by d-D reactions.

19. The method of claim 17, comprising detecting inelastic gamma-rays produced by the inelastic scattering events after emitting the neutrons produced by d-T reactions.

20. The method of claim 17, comprising detecting capture gamma-rays produced by the secondary neutron capture events after emitting the neutrons produced by the d-T reactions.

21. A system comprising: a downhole tool comprising:
a neutron generator configured to emit neutrons into a subterranean formation in pulses separated by a delay, wherein the delay is greater than 2 ms and exceeds a threshold time for neutron capture gamma-ray die-away, the delay varying based upon a logging speed; and
a gamma-ray detector configured to detect activation gamma-rays produced when elements activated by the emitted neutrons decay to a non-radioactive state and configured to provide a gamma-ray signal associated with the detected activation gamma-rays; and
a data processing system configured to receive and to store the gamma-ray signal.

22. The system of claim 21, wherein the downhole tool comprises a neutron monitor configured to detect a portion of the emitted neutrons and configured to provide a neutron signal proportionate to a number of neutrons emitted, and wherein the data processing system is configured to store the neutron signal.

23. The system of claim 22, wherein the data processing system is configured to relate the gamma-ray signal and the neutron signal and to determine a number of detected gamma-rays normalized by a number of emitted neutrons from the neutron signal.

24. The system of claim 21, wherein the gamma-ray signal from the gamma-ray detector comprises an indication of activation gamma-ray spectra and wherein the data processing system is configured to determine whether the activation gamma-ray spectra derives from activated materials in the subterranean formation or in a borehole.

25. The system of claim 21, wherein the data processing circuitry is capable of binning the gamma-ray signal into time bins subdivided during the delay.

26. The system of claim 25, wherein the time bins are of equal length.

27. The system of claim 26, wherein the time bins are of lengths that vary depending on the pulsing scheme.

28. The system of claim 21, wherein the gamma-ray detector is configured to detect an inelastic gamma-ray signal due to inelastic scattering events.

29. The system of claim 21, wherein the gamma-ray detector is configured to detect a neutron capture gamma-ray signal due to neutron capture events.

30. The system of claim 29, wherein the gamma-ray detector is configured to determine a die-away time of the neutron capture gamma-ray signal.

31. The system of claim 30, wherein the data processing system is configured to analyze the die-away time to obtain a sigma measurement.

* * * * *